United States Patent
Sharifi et al.

(10) Patent No.: US 12,537,001 B2
(45) Date of Patent: Jan. 27, 2026

(54) JOINT PROCESSING OF CORRECTIVE AND MISINTERPRETED UTTERANCES FOR ACCURATE ASSISTANT RESPONSES

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 154 days.

(21) Appl. No.: 18/217,930

(22) Filed: Jul. 3, 2023

(65) Prior Publication Data
US 2025/0014574 A1 Jan. 9, 2025

(51) Int. Cl.
*G10L 15/22* (2006.01)
*G10L 15/16* (2006.01)

(52) U.S. Cl.
CPC ............. *G10L 15/22* (2013.01); *G10L 15/16* (2013.01); *G10L 2015/221* (2013.01)

(58) Field of Classification Search
CPC .... G10L 15/22; G10L 15/16; G10L 2015/221
See application file for complete search history.

(56) References Cited

U.S. PATENT DOCUMENTS

| | | | |
|---|---|---|---|
| 2020/0411000 A1* | 12/2020 | Zhang | G10L 15/063 |
| 2022/0013129 A1* | 1/2022 | Carbune | G06V 20/00 |
| 2022/0068261 A1* | 3/2022 | Sharifi | G06F 3/16 |
| 2022/0262349 A1* | 8/2022 | Ren | G10L 19/04 |

FOREIGN PATENT DOCUMENTS

CN 115410552 * 11/2022

OTHER PUBLICATIONS

Machines translation for CN 115410552 (Year: 2022).*

\* cited by examiner

*Primary Examiner* — Qian Yang
(74) *Attorney, Agent, or Firm* — Gray Ice Higdon (57) ABSTRACT

Implementations set forth herein relate to an automated assistant that can jointly process spoken utterances that can include at least one corrective utterance and one utterance that may have been misinterpreted by the automated assistant. In this way, the automated assistant does not need to exclusively rely on the corrective utterance to determine a request of a user but, rather, can utilize data capturing any prior spoken utterance to more accurately determine the request. The automated assistant can process utterances jointly after determining that they are acoustically similar and/or received within a threshold duration of time. The joint processing can involve generating a single input, or multiple inputs, to characterize the series of utterances and processing the single input, or multiple inputs, with one or more neural network models and/or machine learning models. The automated assistant can then proactively correct any previous responses to misinterpreted utterances.

12 Claims, 5 Drawing Sheets

JOINT PROCESSING OF CORRECTIVE AND MISINTERPRETED UTTERANCES FOR ACCURATE ASSISTANT RESPONSES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, interacting with an automated assistant can involve searching the internet using a query that is based on a transcription of a spoken utterance. Such interactions are becoming increasingly adopted due to their convenience and ability to facilitate hands-free operations. However, despite notable progress in speech recognition technology, there remain significant challenges, especially with respect to the accuracy of speech-to-text transcription. This is in part due to the intricacies of spoken language, such as accents, dialects, speech speed, and background noise, which are among the many issues that can result in the misinterpretation of user queries or commands.

For example, a common occurrence when interacting with an automated assistant is the repetition of a command or query by a user, typically driven by the failure of an automated assistant to correctly transcribe a received spoken utterance. Existing speech recognition applications and/or modules often treat these repeated queries as independent tasks, transcribing each query separately and without considering the full context that a series of utterances provides. Such an approach overlooks the fact that repeated queries can otherwise be semantically related and intended to convey the same underlying instruction or request.

Furthermore, a determination of acoustic similarity between different utterances is not typically employed in conventional speech recognition applications. Current methods for improving speech recognition accuracy, such as those based on user feedback and/or self-correction, often do not fully utilize the information inherently present in multiple utterances of the same query. Hence, current systems may not solve these issues to enhance the user experience when interacting with speech-based interfaces.

SUMMARY

Implementations set forth herein relate to an automated assistant or other applications for improving speech recognition, especially in the context of repeated and/or successive spoken utterances. In some implementations, the accuracy of speech recognition is enhanced by processing multiple repeated spoken utterances jointly, instead of separately. For example, a user interacting with their automated assistant can request that the automated assistant initialize playback of a particular song. When the automated assistant misinterprets this command, the user may repeat their spoken utterance. In response, and instead of the automated assistant treating these two commands as separate requests, the automated assistant can jointly process the spoken utterances in furtherance of more accurately interpreting an intent of the user and their command. In some instances, repeated commands can come from multiple users in the same context (e.g., at a dinner party), and the implementations herein can nonetheless be utilized to process sequences of utterances from different users, thereby further enhancing the transcription accuracy across multiple different users.

In some implementations, the automated assistant can consider separate utterances to be related when the utterances are provided by a user and/or different users within a threshold duration of time. In response, the automated assistant can process audio snippets corresponding to the spoken utterances to determine whether their acoustic similarities indicate they are a series of repeated commands. Said another way, when multiple spoken utterances are provided within a threshold duration of time, the automated assistant can determine whether a latter spoken utterance is intended to be a clarification of a former spoken utterance. In some implementations, this determination can be performed subsequent to the automated assistant audibly and/or visually rendering a transcription of the former spoken utterance (i.e., the spoken utterance that is not a most recent spoken utterance, of the utterances provided within the threshold duration of time).

When the automated assistant determines that multiple spoken utterances are acoustically similar and therefore should be jointly processed, the joint processing of these utterances can be performed according to one or more different processes. In some implementations, each spoken utterance of a set of utterances can be processed using one or more trained machine learning models to determine probabilities for outputs for each respective utterance. The probabilities can then be averaged and/or weighted for each respective output over a predicted collection of outputs for the set of utterances. The output with a highest probability and/or most prioritized output can then be selected for determining a response of the automated assistant to the set of utterances (e.g., an initial spoken utterance from the user and a subsequent, corrective spoken utterance from the user or another user).

In some implementations, a set of utterances of different lengths can be pre-processed such that data for two or more utterances are padded to have a more uniform length or near-uniform length. In this way, joint processing can be more effective for utterances of different lengths, and interpretation(s) by a language model can be more uniform across different utterances. In some implementations, further training (e.g., contrastive learning) of a model can be undertaken based on joint utterance processing to further improve the accuracy of the model.

In some implementations, joint processing of utterances can be performed and thereafter utilized to retroactively correct interpretations of previously-received spoken utterances. In other words, pro-active processing of previously-received utterances can be performed, with prior permission from any associated users, to determine whether any interpretations of the previously-received utterances were incorrect, and then proactively correct any prior assistant responses. For example, a user may have previously provided a spoken utterance such as, "Assistant, next week, remind me to take Kaiser to the pet area after breakfast." However, the automated assistant may have responded to this spoken utterance by creating an incorrect reminder, such as "Take Kaiser to the pizzeria after breakfast." The following day, the user may interact with the automated assistant to provide an additional spoken utterance such as, "Assistant, is there a pet area nearby where people drop their dogs off?" In response, the automated assistant can determine that the previously-received spoken utterance was interpreted incorrectly and then provide a response to the additional spoken utterance, such as "Yes, there is a pet area 0.25 miles from here . . . " and a corrective response, such as, "I may have misinterpreted your request from yesterday, so I corrected the stored reminder." The stored reminder can then be corrected by the automated assistant. Alternatively, the automated assistant can expressly indicate the correction by providing a response such as, "I corrected the reminder from yesterday to be: 'Take Kaiser to the pet area after breakfast.'" In this way, the automated assistant can proactively and retroactively correct misinterpretations of previously received utterances.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
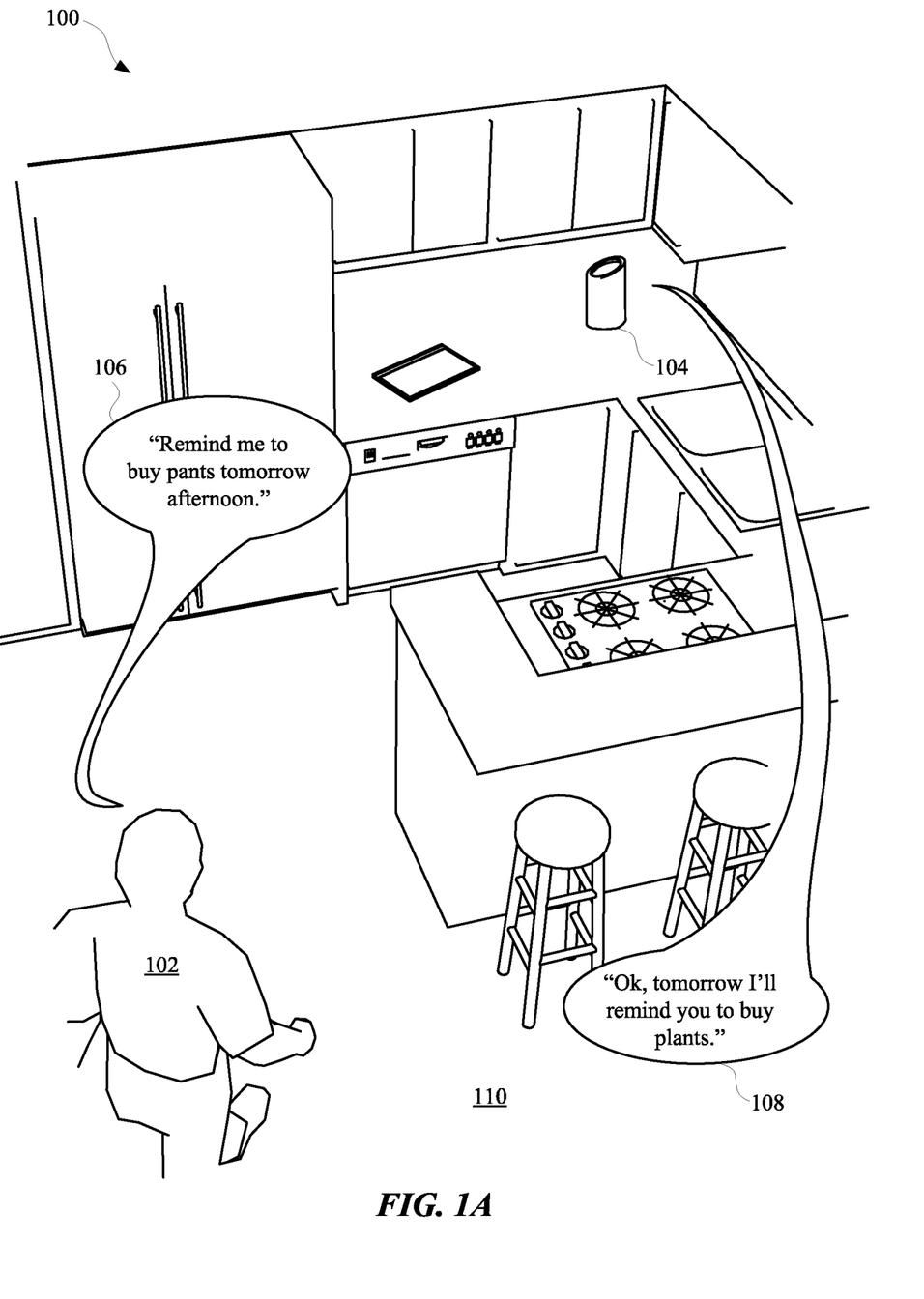
FIG. 1A and FIG. 1B illustrate views of a user interacting with an automated assistant processing a series of spoken utterances to determine a request of a user when the automated assistant may not have correctly interpreted an initial spoken utterance of the series.
Figure 1B:
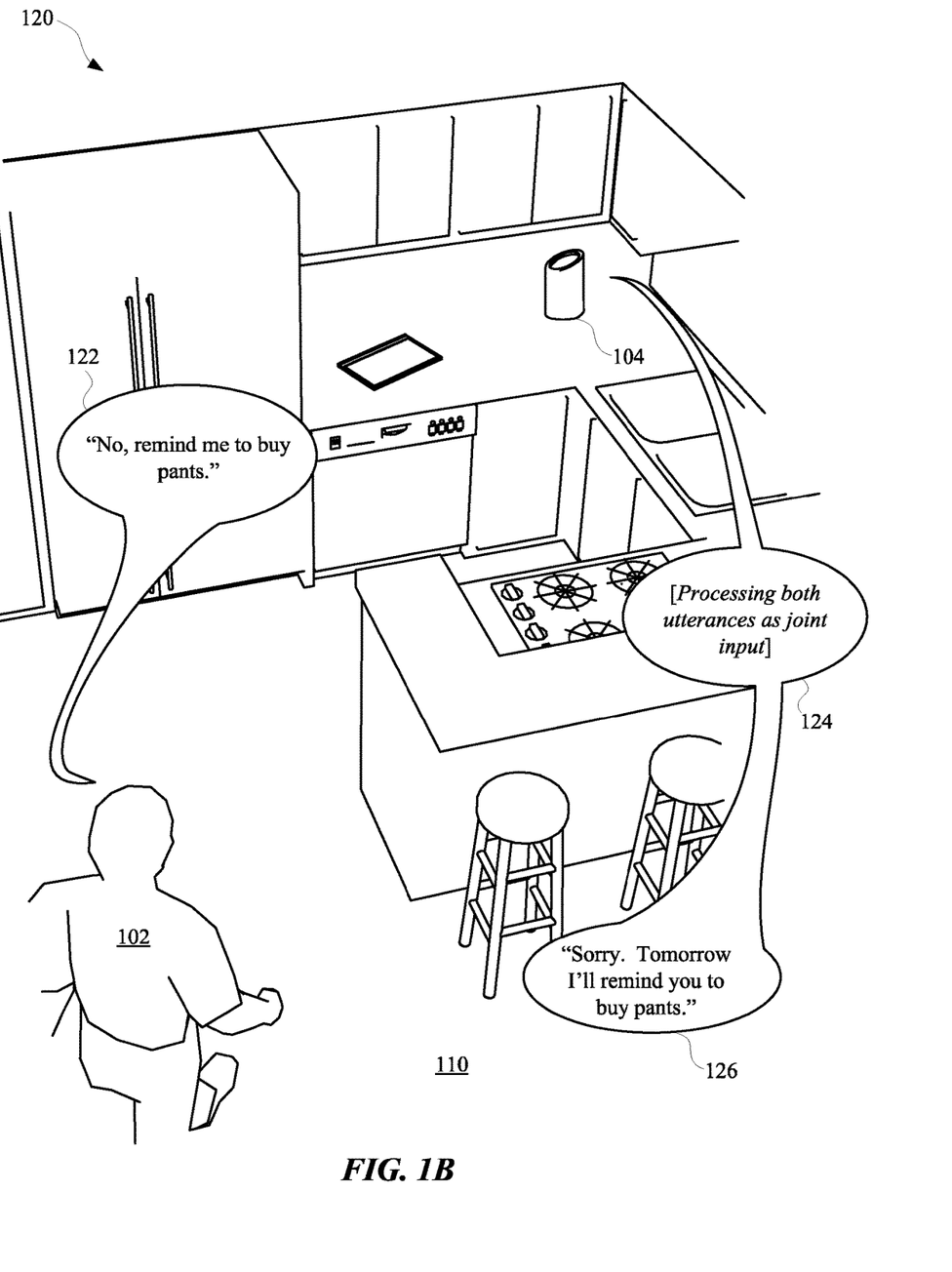

FIG. 1A and FIG. 1B illustrate a view 100 and a view 120 of a user 102 interacting with an automated assistant that jointly processes a series of spoken utterances, which can include an initial spoken utterance that was not correctly interpreted by the automated assistant. In other words, even though the initial spoken utterance was not interpreted correctly by the automated assistant, the automated assistant can nonetheless process the initial spoken utterance in combination with any subsequent spoken utterance so that the automated assistant can more accurately determine a request of the user. For example, the user 102 can provide an initial spoken utterance 106 such as, "Remind me to buy pants tomorrow afternoon" while in their kitchen 110. In response, a computing device 104 that provides access to the automated assistant can render an audible output 108 such as, "Ok, tomorrow I'll remind you to buy plants." Because this output from the automated assistant is an incorrect interpretation of the initial spoken utterance 106, the user 102 can choose to respond with a corrective spoken utterance 122.

For example, and as illustrated in view 120 of FIG. 1B, the user 102 can provide a corrective spoken utterance 122 such as, "No, remind me to buy pants." In response to this subsequent spoken utterance, the automated assistant can perform one or more operations 124 in furtherance of processing both utterances as a joint input, and/or otherwise process both utterances together. In some implementations, the automated assistant can determine to process both utterances by initially determining whether the second spoken utterance was provided within a threshold duration of time from the initial spoken utterance 106 and/or a responsive output of the automated assistant. For example, the threshold duration of time can be/seconds from when the user 102 provided the initial spoken utterance 106 or u seconds from when the automated assistant rendered the responsive output to the spoken utterance 106 (e.g., wherein/and u are any time value).

When the corrective spoken utterance 122 is determined to have been provided within the threshold duration of time, the automated assistant and/or another application can determine whether the initial spoken utterance 106 and the corrective spoken utterance 122 are acoustically similar. In other words, the automated assistant can determine whether the spoken utterances satisfy a criterion for determining that the spoken utterances are acoustically similar. In some implementations, the utterances can be determined to be acoustically similar when predictions for interpretations of each spoken utterance at least partially overlap. For example, a first set of predictions can be determined for the initial spoken utterance 106 and a second set of predictions can be determined for the correction spoken utterance 122. When N number of predictions of the first set of predictions include one or more words, phrases, and/or phonemes that are also included in one or more of the predictions of the second set of predictions, the utterances can be determined to be acoustically similar. For example, the first set of predictions can include N number of predictions that include the words "tomorrow" and "afternoon," and the second set of predictions can include at least M number of predictions that also include the words "tomorrow" and "afternoon" (where N and M are any positive number). In some implementations, M and N can both be greater than 1, and can be equal to each other or different from each other.

Alternatively, or additionally, a spectral mapping for each respective spoken utterance can be generated and compared to determine whether the spectral mappings have a threshold number of shared features. When the spectral mappings include a threshold number of shared features (e.g., shared threshold number of frequency amplitudes, etc.), the utterances can be considered to be acoustically similar. Alternatively, or additionally, embeddings can be generated from audio embodying the utterances, and the embeddings can be mapped to a latent space. When a distance in latent space between the embeddings satisfies a threshold distance, the utterances can be considered to be acoustically similar.

When the automated assistant determines that the spoken utterances are acoustically similar, the automated assistant can proceed with processing the received utterances together. In some implementations, input data can be generated to embody both the initial spoken utterance 106 and the corrective spoken utterances 122. In some implementations, the input data can be generated such that one or more of the embodied utterances are padded (e.g., zero padding) such that the utterances will be received with all uniform lengths. In some implementations, instances of input data characterizing each respective utterance can be processed using one or more of the same or different neural networks and/or machine learning models. For example, a neural network model can be utilized to process input data that characterizes both utterances, and an output of the neural network model can be used as a basis for determining the operation that the user is requesting the automated assistant to perform. Alternatively, or additionally, a neural network model can be utilized to process separate instances of input data that each characterize a particular utterances, and each output of the model can be processed collectively to determine a most likely interpretation of the utterances and/or a most likely request to be fulfilled. In some implementations, portions of audio data characterizing each spoken utterance can be modified to improve an accuracy of a resulting interpretation of the utterances. For example, sub-portions of each utterance can be processed to determine whether they are acoustically similar to other sub-portions of other utterances. Any sub-portions that are not determined to be acoustically similar can be omitted from further processing, thereby improving the accuracy of a resulting interpretation. For example, the sub-portion "No, what I said was . . . " can be omitted from input data during processing because the sub-portion was not acoustically similar to any other utterance that is being jointly processed. When a highest probability prediction and/or most prioritized prediction is determined for the utterances, the automated assistant can initialize performance of one or more operations and/or corrective operations in furtherance of fulfilling a request embodied in the prediction. Furthermore, the automated assistant can optionally provide a corrective output 126 such as, "Sorry. Tomorrow I'll remind you to buy pants."

By processing a series of spoken utterances in this way, interactions between users and automated assistants can be streamlined to consume less time and computational resources, such as memory and network bandwidth. Furthermore, by ensuring that certain threshold requirements are met before further processing a series of utterances in this way, the automated assistant can avoid joint processing of utterances that are not intended to be corrective. This can preserve computational bandwidth of any assistant-enabled device. Furthermore, this can improve the training data that may be generated, with prior permission from any associated users, for further training any speech processing models. Further training of models can assist with retro-active corrections of misinterpretations, which can improve the accuracy of the automated assistant and ensure that the automated assistant is operating more accurately and in accordance with the intentions of any users.

Figure 2:
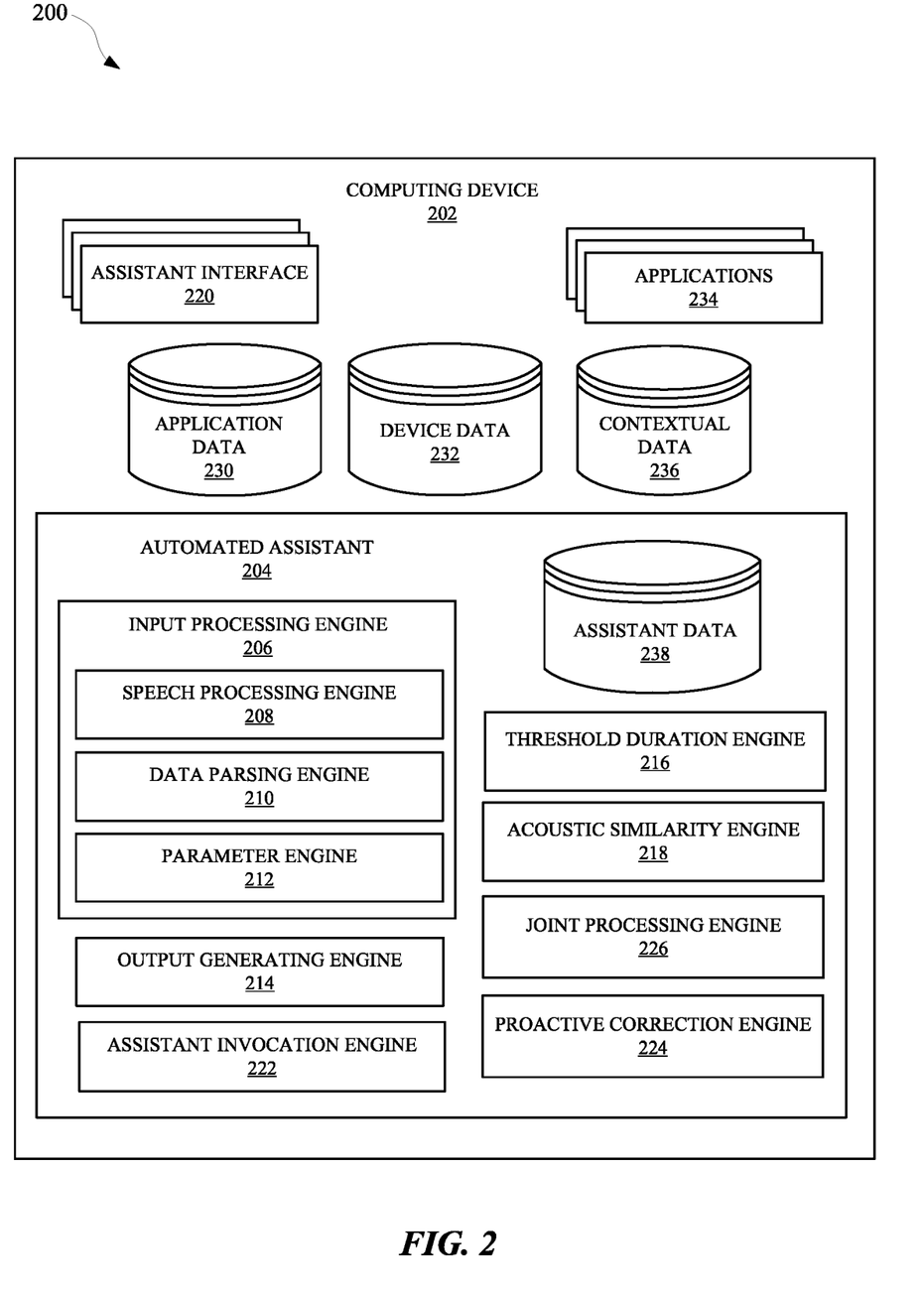
FIG. 2 illustrates a system that provides an automated assistant with an ability to jointly process spoken utterances when those utterances include a correction and/or clarification of a previous utterance.

FIG. 2 illustrates a system 200 that provides an automated assistant 204 with an ability to jointly process spoken utterances when those utterances include a correction and/or clarification of a previous utterance. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to expressly speak the invocation phrase. This can streamline assistant interactions when a user follows up a misinterpreted spoken utterance with a corrective spoken utterance, without including an invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a threshold duration engine 216 that can determine whether a spoken utterance was received within a threshold duration of time from a prior spoken utterance and/or a response from the automated assistant 204. For example, when a user provides a spoken utterance to direct the automated assistant 204 to perform an operation, the automated assistant 204 can respond by visually rendering and/or audibly rendering a response. The response can include textual content that can indicate a transcription of what the automated assistant 204 interpreted the spoken utterance to be. When the user understands the response from the automated assistant 204 to be a misinterpretation of their spoken utterance, the user can provide an additional, corrective spoken utterance. The corrective spoken utterance can be the same or different from the initial spoken utterance. For example, the utterances can have the same natural language content but with different emphases on different phonemes. Alternatively, or additionally, the spoken utterances can have different natural language content because the user has elected to change the wording in the hopes of improving the interpretation by the automated assistant 204.

When a subsequent spoken utterance is determined to be received within a threshold duration of time by the threshold duration engine 216, an acoustic similarity engine 218 can further process the spoken utterances. The acoustic similarity engine 218 can determine whether the utterances, and/or data characterizing the utterances, exhibit one or more acoustic similarities and/or otherwise satisfy one or more criteria for determining acoustic similarity. In some implementations, first predictions can be generated from the first spoken utterance and second predictions can be generated from the second spoken utterance. The acoustic similarity engine 218 can determine whether highest probability predictions (e.g., N highest) of the first predictions share one or more textual features with one or more predictions of the second predictions, and/or with highest probability predictions (e.g., M highest) of the second predictions. When acoustic similarity is determined according to the implementations herein, the acoustic similarity engine 218 can indicate, to a joint processing engine 226, that the utterances should be processed together to determine a more accurate interpretation.

In some implementations, the joint processing engine 226 can process input data characterizing the spoken utterances that have been determined to satisfy the threshold duration and are also determined to be acoustically similar. Joint processing of the input data can involve padding each utterance such that each utterance exhibits the same length as the other. Alternatively, or additionally, joint processing of the input data can involve separating audio data to isolate the initial utterance and the corrective utterance. Thereafter, each instance of audio data can be processed to generate predictions for interpretations of each instance. In some implementations, each prediction can include a transcription of a corresponding spoken utterance and/or an intent that the user is predicted to be requesting. Thereafter, certain generated predictions can be processed to determine an accurate interpretation and/or request intended by the user. In some implementations, portions of the highest probability predictions and/or most prioritized predictions can be combined to determine a particular prediction that can be used as a basis for determining one or more operations to initialize in response to the utterances. Alternatively, or additionally, a joint beam search can be performed on neural network model outputs to determine the most probable interpretations for each utterance, and further process those interpretations to select a suitable operation(s) to initialize in response to the utterances.

In some implementations, the joint processing engine 226 can communicate with a proactive correction engine 224 to determine whether any previously received utterances were misinterpreted (e.g., utterances received earlier in the day, and/or before any series of utterances was received). The proactive correction engine 224 can then perform an operation to determine a likelihood that any previously received utterances were misinterpreted and, when appropriate, determine whether to initialize performance of a corrective operation. For example, a response of the automated assistant 204 to a previously misinterpreted spoken utterance can be storing a reminder for the wrong task, creating an event with the wrong title, and/or otherwise creating data that is not accurate. Therefore, when the proactive correction engine 224 determines that the automated assistant 204 previously misinterpreted a spoken utterance, the automated assistant 204 can proactively perform a corrective operation to correct any previously executed incorrect operation. In this way, the user will not have to keep providing spoken utterances to correct prior misinterpretations but, rather, can rely on the automated assistant 204 to make these corrections proactively. This can preserve computational resources of any affected devices that provide access to the automated assistant 204, since those devices would be receiving less audio to process.

Figure 3:
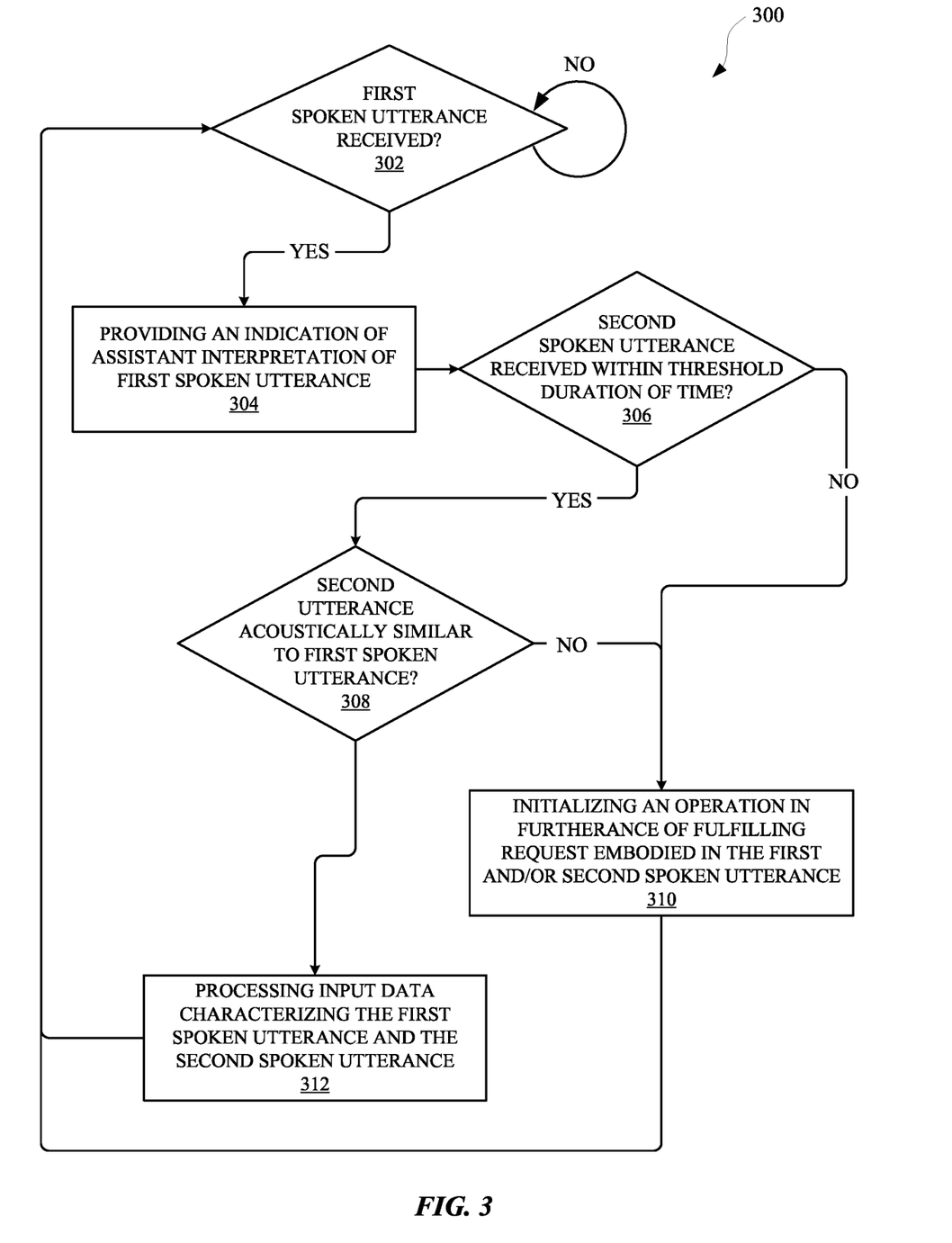
FIG. 3 illustrates a method for processing a series of spoken utterances together to identify a particular operation that a user is intending an automated assistant application, or other application, to perform.

FIG. 3 illustrates a method 300 for processing a series of spoken utterances together to identify a particular operation that a user is intending an automated assistant application, or other application, to perform. The method 300 can be performed by one or more applications, modules, and/or any other apparatus that can interact with an automated assistant. The method 300 can include an operation 302 of determining whether a first spoken utterance has been received by an automated assistant application and/or other application.

The first spoken utterance can be, for example, "Assistant, start the vacuum cleaner at 3 PM," which can be a request for the automated assistant to cause a third party application to initialize a third party device (e.g., the autonomous vacuum cleaner).

The method 300 can proceed from the operation 302 to an operation 304 of providing an indication of the assistant interpretation of the first spoken utterance. The indication can be provided by rendering an audio output and/or a visual output from a computing device that is accessible to the automated assistant application. In this way, the user or another user can determine whether the first spoken utterance was accurately interpreted by the automated assistant application. When the user, or the other user, determines that the automated assistant interpreted the first spoken utterance incorrectly, the user or the other user can provide a second spoken utterance.

The method 300 can proceed from the operation 304 to an operation 306 of determining whether the second spoken utterance was received during a threshold duration of time. In some implementations, the threshold duration of time can be a static or dynamic value that is measured relative to the first spoken utterance or any other relevant action associated with the user, the other user, and/or the automated assistant. Alternatively, or additionally, the threshold duration of time can be a static or dynamic value that is measured relative to output of the automated assistant that indicates the interpretation of, or response to, the first spoken utterance by the automated assistant. In some implementations, the threshold duration of time can be dynamic based on the interpretation by the automated assistant, a context of the user and/or the other user, a prediction request embodied in the first spoken utterance and/or the second spoken utterance, and/or any other information from which a threshold can be based.

When the second spoken utterance is received within the threshold duration of time, the method 300 can proceed from the operation 306 to an operation 308. Otherwise, the method 300 can proceed from the operation 306 to an operation 310. The operation 308 can include determining whether the second spoken utterance is acoustically similar to the first spoken utterance. Determining acoustic similarity can involve determining whether the received spoken utterances satisfy one or more criteria, which can be different according to various implementations. For example, in some implementations, acoustic similarity between utterances can be determined by generating embeddings based on each utterance and determining a distance between the embeddings when mapped to a latent embedding space. When the distance between embeddings satisfies a threshold distance, the utterances can be determined to be acoustically similar.

In some implementations, acoustic similarity can be determined by comparing a first set of predictions generated for the first spoken utterance and a second set of predictions generated for the second spoken utterance. In some implementations, each prediction can be generated with a corresponding probability that the respective prediction accurately characterized a respective utterance. When a highest probability prediction, or most prioritized prediction, of the first set of predictions is included in the second set of predictions, the highest priority prediction can be determined to be acoustically similar. Alternatively, or additionally, when N number of predictions of the first set of predictions embody one or more words or phrases that are also in an M number of predictions of the second set of predictions, the utterances can be determined to be acoustically similar (e.g., where N and M are greater than or equal to 1, and M and N are either the same or different numbers).

Alternatively, or additionally, the utterances can be determined to be acoustically similar when a frequency spectrum mapping of audio corresponding to the first spoken utterance embodies a threshold number of features that are also embodied in another frequency spectrum mapping of other audio corresponding to the second spoken utterance. Alternatively, or additionally, the utterances can be determined to be acoustically similar when a feature representation, such as a frequency spectrum, is within a threshold distance of another feature representation.

When the utterances are determined to be acoustically similar, the method 300 can proceed from the operation 308 to an operation 312. Otherwise, when the utterances are determined to not be acoustically similar, the method 300 can proceed from the operation 308 to an operation 310. The operation 310 can include initializing an operation in furtherance of fulfilling a request embodied in the first spoken utterance and/or the second spoken utterance. In other words, because the automated assistant determined that the utterances were not received within the threshold duration of time and/or were not acoustically similar, the automated assistant can proceed with separately fulfilling each of them, unless expressly requested otherwise by the user or the other user.

When the second spoken utterance is acoustically similar to the first spoken utterance, the method 300 can proceed to an operation 312, which can include processing input data characterizing the first spoken utterance and the second spoken utterance. In some implementations, the input data can be processed as a single input to one or more neural network models to determine one or more operations to initialize in response to the utterances. Alternatively, or additionally, the input data can be generated by padding the input data such that each portion of data characterizing each utterance can be the same length and/or within a threshold length of each other. Thereafter, the input data can be processed using one or more trained machine learning models, neural networks, and/or heuristic processes.

In some implementations, the spoken utterances can be jointly processed by compiling phonemes, words, and/or phrases and/or other textual features that have the highest probability, and/or are the most prioritized, for different portions of predictions utilized to generate the input data. Any phonemes, words, phrases, and/or other textual or language features that are not in both sets of predictions of at least the first set of predictions and the second set of predictions can be optionally omitted from further processing. The compilation can then be processed according to a natural language understanding (NLU) and/or natural language processing (NLP) technique to determine one or more operations that the user intended the automated assistant to perform.

For example, a first set of predictions for the first spoken utterance can include "Set a reminder to buy kitty litter tomorrow" and "Set a reminder to find any dinner tomorrow," and the second set of predictions for the second spoken utterance can include "No, reminder to buy kitty litter tomorrow" and "No, remind me to buy kitty litter tomorrow." In some implementations, portions of each set can be filtered to remove words, phrases, and/or phonemes not included in all sets such as, by removing the word "No," "Set," and "dinner." As a result of the processing, the resulting input to be processed can be, "Reminder to buy kitty litter tomorrow." By processing this resulting input, the automated assistant can ultimately determine that the user is intending for a reminder to be created and can then set a reminder to "buy kitty litter tomorrow."

In some implementations, separate instances of data corresponding to each respective spoken utterance can be separately processed using a neural network model to generate a respective first output and separate second output. Thereafter, determining the particular operation to initialize can be performed using joint beam searching based on the first output and the second output, and/or using probability distributions of the first output and the second output. Thereafter, a most prioritized output or outputs resulting from the beam searching can be selected as a basis for determining the operation(s) to perform in response to the spoken utterances.

Figure 4:
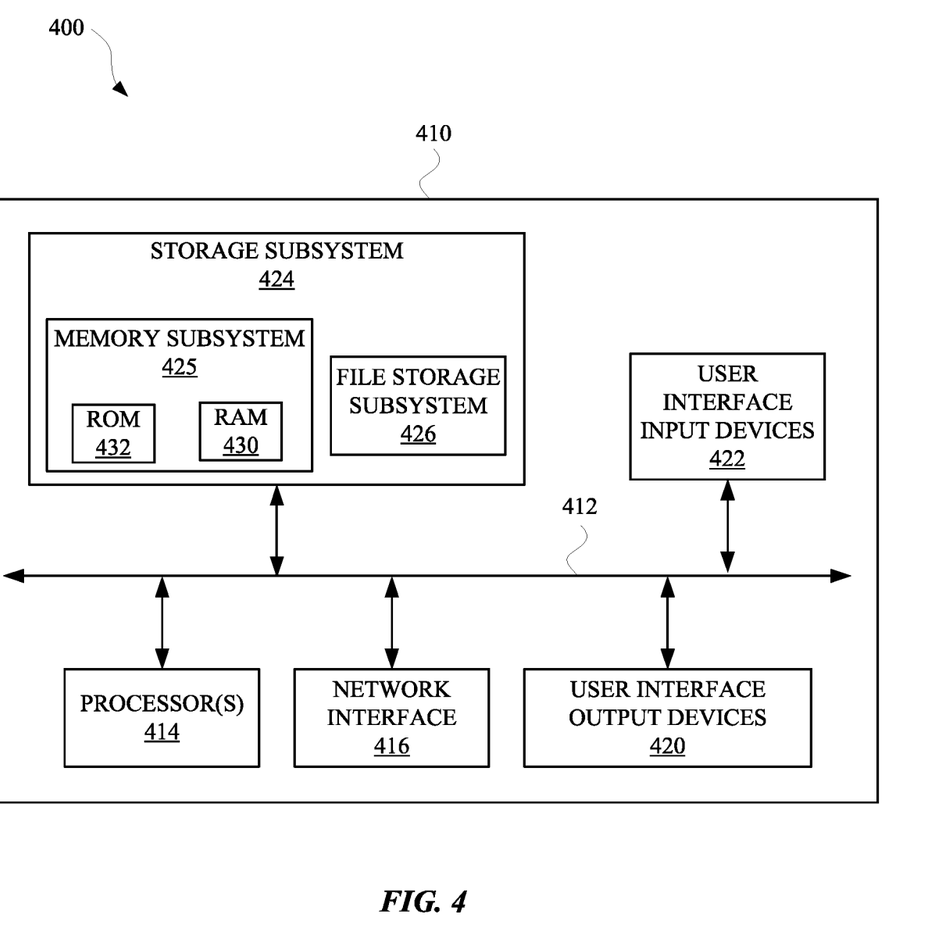
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, by an automated assistant application, a first spoken utterance provided by a user in furtherance of causing the automated assistant application to initialize a particular operation. The method can further include providing, in response to receiving the first spoken utterance, an output that indicates an interpretation, by the automated assistant application, of the first spoken utterance. The method can further include receiving, subsequent to the user providing the first spoken utterance, a second spoken utterance from the user, or another user, based on the output of the automated assistant application misinterpreting the first spoken utterance. The method can further include determining, in response to receiving the second spoken utterance, that the first spoken utterance and the second spoken utterance satisfy a criterion for indicating acoustic similarity of the first spoken utterance and the second spoken utterance. The method can further include, in response to determining that the first spoken utterance and the second spoken utterance satisfy the criterion for indicating acoustic similarity: processing input data corresponding to the first spoken utterance and the second spoken utterance in furtherance of determining the particular operation to initialize in response to receiving at least the first spoken utterance. The method can further include causing, based on processing the input data, the automated assistant application to initialize performance of the particular operation.

In some implementations, determining that the first spoken utterance and the second spoken utterance satisfy the criterion for indicating acoustic similarity includes: determining first predictions for the first spoken utterance and second predictions for the second spoken utterance; and determining that a particular prediction is included in both the first predictions and second predictions. In some implementations, determining that the particular prediction is included in both the first predictions and the second predictions includes: determining that a threshold number of highest probability predictions, and/or a most prioritized predictions, of each of the first predictions and the second predictions share one or more textual features, wherein the threshold number is greater than 1.

In some implementations, determining that the first spoken utterance and the second spoken utterance satisfy the criterion for indicating acoustic similarity includes: generating a first embedding based on the first spoken utterance and a second embedding based on the second spoken utterance; and determining that a distance in an embedding space, between the first embedding and the second embedding, satisfies a threshold distance. In some implementations, determining that the first spoken utterance and the second spoken utterance satisfy the criterion for indicating acoustic similarity includes: determining that first audio corresponding to the first spoken utterance exhibits a spectral mapping that is of a threshold similarity to another spectral mapping exhibited by second audio corresponding to the second spoken utterance. In some implementations, processing the input data corresponding to the first spoken utterance and the second spoken utterance in furtherance of determining the particular operation to initialize includes: separately processing the first spoken utterance and the second spoken utterance, using a neural network model, to generate a respective first output and separate second output; and determining the particular operation to initialize using joint beam searching based on the first output and the second output, or using probability distributions of the first output and the second output.

In some implementations, processing the input data includes determining the particular operation to initialize using probability distributions of the first output and the second output, and wherein using the probability distributions includes: determining that a highest probability of the first output corresponds to a predicted operation that also corresponds to an output included in the N-highest probability outputs of the second output. In some implementations, processing the input data corresponding to the first spoken utterance and the second spoken utterance in furtherance of determining the particular operation to initialize includes: providing, to a neural network model, a single input that embodies data characterizing the first spoken utterance and the second spoken utterance, wherein an output of the neural network model provides a basis for determining the particular operation to initialize. In some implementations, the neural network model is trained using contrastive learning with paired instances of data characterizing the different ways to request a certain assistant operation. In some implementations, processing the input data corresponding to the first spoken utterance and the second spoken utterance in furtherance of determining the particular operation to initialize includes: generating the single input with padding data such that the first spoken utterance has a modified time length that is more similar, to a length in time of the second spoken utterance, than is the first spoken utterance without the padding data.

In some implementations, processing the input data corresponding to the first spoken utterance and the second spoken utterance in furtherance of determining the particular operation to initialize includes: determining first predictions for the first spoken utterance and second predictions for the second spoken utterance; and determining that a highest probability and/or a most prioritized prediction of the first predictions is included in the second predictions. In some implementations, processing the input data corresponding to the first spoken utterance and the second spoken utterance in furtherance of determining the particular operation to initialize includes: determining that a particular word or a particular phrase, corresponding to the particular operation, is included in a highest total number of predictions of the first predictions and the second predictions. In some implementations, processing the input data corresponding to the first spoken utterance and the second spoken utterance in furtherance of determining the particular operation to initialize includes: determining a set of predictions based on processing audio data that characterizes the first spoken utterance and the second spoken utterance; and determining that a highest total number of predictions of the set of predictions are directed to the particular operation.

In other implementations, a method implemented by one or more processors is set forth S including operations such as processing input data characterizing a series of spoken utterances that include at least one corrective spoken utterance, wherein the corrective spoken utterance is provided by a user to an automated assistant application to correct a misinterpretation of a prior spoken utterance received by the automated assistant application in the series of spoken utterances. The method can further include determining, based on processing the input data and other data that characterizes a separate spoken utterance, that the separate spoken utterance resulted in a separate misinterpretation by the automated assistant, wherein the separate spoken utterance was responded to by the automated assistant application before receiving the series of spoken utterances. The method can further include causing, based on processing the input data and the other data, the automated assistant application to initialize performance of a corrective operation to correct any previous operation that was performed based on the separate misinterpretation.

In some implementations, determining that the separate spoken utterance resulted in the separate misinterpretation includes: processing additional input data, characterizing the separate spoken utterance, using an updated neural network model that has been trained using training data that is based on the series of spoken utterances. In some implementations, the training data is generated using contrastive learning and includes other input data that characterizes other spoken utterances with shared acoustic features.

In yet other implementations, a method implemented by one or more processors is set forth as including operations such as receiving, by an automated assistant application, a first spoken utterance provided by a first user in furtherance of causing the automated assistant application to initialize a particular operation. The method can further include providing, in response to receiving the first spoken utterance, an output that indicates an interpretation, by the automated assistant application, of the first spoken utterance. The method can further include receiving, subsequent to the first user providing the first spoken utterance, a second spoken utterance from a second user. The method can further include determining, in response to receive the second spoken utterance, that the second spoken utterance was received within a threshold duration of time from receiving the first spoken utterance. The method can further include determining, in response to receiving the second spoken utterance within the threshold duration of time, that the first spoken utterance and the second spoken utterance satisfy a criterion for indicating acoustic similarity of the first spoken utterance and the second spoken utterance. The method can further include, in response to determining that the first spoken utterance and the second spoken utterance satisfy the criterion for indicating acoustic similarity: processing input data corresponding to the first spoken utterance and the second spoken utterance in furtherance of determining the particular operation to initialize in response to receiving at least the first spoken utterance. The method can further include causing, based on processing the input data, the automated assistant application to initialize performance of the particular operation.

In some implementations, determining that the first spoken utterance and the second spoken utterance satisfy the criterion for indicating acoustic similarity includes: determining first predictions for the first spoken utterance and second predictions for the second spoken utterance; and determining that a particular prediction is included in both the first predictions and second predictions, wherein the particular prediction corresponds to the particular operation. In some implementations, determining that the particular prediction is included in both the first predictions and the second predictions includes: determining that a threshold number of highest probability predictions, and/or a most prioritized predictions, of each of the first predictions and the second predictions share one or more textual features, wherein the threshold number is greater than 1. In some implementations, determining that the first spoken utterance and the second spoken utterance satisfy the criterion for indicating acoustic similarity includes: determining first predictions for the first spoken utterance and second predictions for the second spoken utterance; and determining that one or more words or phrases in a highest probability prediction and/or a most prioritized prediction of the first predictions are also included in a particular prediction of the second predictions, wherein the particular prediction corresponds to the particular operation.

We claim:

1. A method implemented by one or more processors, the method comprising:

receiving, by an automated assistant application, a first spoken utterance provided by a user in furtherance of causing the automated assistant application to initialize a particular operation;

providing, in response to receiving the first spoken utterance, an output that indicates an interpretation, by the automated assistant application, of the first spoken utterance;

receiving, subsequent to the user providing the first spoken utterance, a second spoken utterance from the user, or another user, based on the output of the automated assistant application misinterpreting the first spoken utterance;

determining, in response to receiving the second spoken utterance, that the first spoken utterance and the second spoken utterance satisfy a criterion for indicating acoustic similarity of the first spoken utterance and the second spoken utterance;

in response to determining that the first spoken utterance and the second spoken utterance satisfy the criterion for indicating acoustic similarity:

processing input data corresponding to the first spoken utterance and the second spoken utterance in furtherance of determining the particular operation to initialize in response to receiving at least the first spoken utterance, wherein processing the input data corresponding to the first spoken utterance and the second spoken utterance in furtherance of determining the particular operation to initialize includes:

generating a single input data, with padding data such that the first spoken utterance has a modified time length that is more similar, to a length in time of the second spoken utterance, than is the first spoken utterance without the padding data, wherein the single input data embodies the first spoken utterance and the second spoken utterance; and determining, based on processing the single input data using a neural network model, the particular operation; and causing, based on processing the input data, the automated assistant application to initialize performance of the particular operation.

2. The method of claim 1, wherein determining that the first spoken utterance and the second spoken utterance satisfy the criterion for indicating acoustic similarity includes:

determining first predictions for the first spoken utterance and second predictions for the second spoken utterance; and determining that a particular prediction is included in both the first predictions and second predictions.

3. The method of claim 2, wherein determining that the particular prediction is included in both the first predictions and the second predictions includes:

determining that a threshold number of highest probability predictions, and/or a most prioritized predictions, of each of the first predictions and the second predictions share one or more textual features, wherein the threshold number is greater than 1.

4. The method of claim 1, wherein determining that the first spoken utterance and the second spoken utterance satisfy the criterion for indicating acoustic similarity includes:

generating a first embedding based on the first spoken utterance and a second embedding based on the second spoken utterance; and determining that a distance in an embedding space, between the first embedding and the second embedding, satisfies a threshold distance.

5. The method of claim 1, wherein determining that the first spoken utterance and the second spoken utterance satisfy the criterion for indicating acoustic similarity includes:
   determining that first audio corresponding to the first spoken utterance exhibits a spectral mapping that is of a threshold similarity to another spectral mapping exhibited by second audio corresponding to the second spoken utterance.

6. A method implemented by one or more processors, the method comprising:
   processing input data characterizing a series of spoken utterances that include at least one corrective spoken utterance,
      wherein the corrective spoken utterance is provided by a user to an automated assistant application to correct a misinterpretation of a prior spoken utterance received by the automated assistant application in the series of spoken utterances;
   determining, based on processing the input data and other data that characterizes a separate spoken utterance, that the separate spoken utterance resulted in a separate misinterpretation by the automated assistant,
      wherein the separate spoken utterance was responded to by the automated assistant application before receiving the series of spoken utterances;
   processing the input data and the other data that characterizes the separate spoken utterance in furtherance of determining a corrective operation to correct any previous operation performed based on the separate misinterpretation, wherein processing the input data and the other data that characterizes the separate spoken utterance in furtherance of determining the corrective operation includes:
      generating a single input data, with padding data such that the input data has a modified time length that is more similar, to a length in time of the other data, than is the input data without the padding data, wherein the single input data embodies the input data and the other data; and
      determining, based on processing the single input data using a neural network model, the corrective operation; and
   causing, based on processing the single input data, the automated assistant application to initialize performance of the corrective operation.

7. The method of claim 6, wherein determining that the separate spoken utterance resulted in the separate misinterpretation includes:
   processing additional input data, characterizing the separate spoken utterance, using an updated neural network model that has been trained using training data that is based on the series of spoken utterances.

8. The method of claim 7, wherein the training data is generated using contrastive learning and includes other input data that characterizes other spoken utterances with shared acoustic features.

9. A method implemented by one or more processors, the method comprising:
   receiving, by an automated assistant application, a first spoken utterance provided by a first user in furtherance of causing the automated assistant application to initialize a particular operation;
   providing, in response to receiving the first spoken utterance, an output that indicates an interpretation, by the automated assistant application, of the first spoken utterance;
   receiving, subsequent to the first user providing the first spoken utterance, a second spoken utterance from a second user;
   determining, in response to receiving the second spoken utterance, that the second spoken utterance was received within a threshold duration of time from receiving the first spoken utterance;
   determining, in response to receiving the second spoken utterance within the threshold duration of time, that the first spoken utterance and the second spoken utterance satisfy a criterion for indicating acoustic similarity of the first spoken utterance and the second spoken utterance; and
   in response to determining that the first spoken utterance and the second spoken utterance satisfy the criterion for indicating acoustic similarity:
      processing input data corresponding to the first spoken utterance and the second spoken utterance in furtherance of determining the particular operation to initialize in response to receiving at least the first spoken utterance, wherein processing the input data corresponding to the first spoken utterance and the second spoken utterance in furtherance of determining the particular operation to initialize includes:
         generating a single input data, with padding data such that the first spoken utterance has a modified time length that is more similar, to a length in time of the second spoken utterance, than is the first spoken utterance without the padding data, wherein the single input data embodies the first spoken utterance and the second spoken utterance; and
         determining, based on processing the single input data using a neural network model, the particular operation; and
      causing, based on processing the input data, the automated assistant application to initialize performance of the particular operation.

10. The method of claim 9, wherein determining that the first spoken utterance and the second spoken utterance satisfy the criterion for indicating acoustic similarity includes:
    determining first predictions for the first spoken utterance and second predictions for the second spoken utterance; and
    determining that a particular prediction is included in both the first predictions and second predictions,
       wherein the particular prediction corresponds to the particular operation.

11. The method of claim 10, wherein determining that the particular prediction is included in both the first predictions and the second predictions includes:
    determining that a threshold number of highest probability predictions, and/or a most prioritized predictions, of each of the first predictions and the second predictions share one or more textual features,
       wherein the threshold number is greater than 1.

12. The method of claim 9, wherein determining that the first spoken utterance and the second spoken utterance satisfy the criterion for indicating acoustic similarity includes:

determining first predictions for the first spoken utterance and second predictions for the second spoken utterance; and determining that one or more words or phrases in a highest probability prediction and/or a most prioritized prediction of the first predictions are also included in a particular prediction of the second predictions,
wherein the particular prediction corresponds to the particular operation.

\* \* \* \* \*